March 6, 1945. A. BARNA Re. 22,610
UNDERWATER TORCH
Original Filed Oct. 30, 1939 3 Sheets-Sheet 1
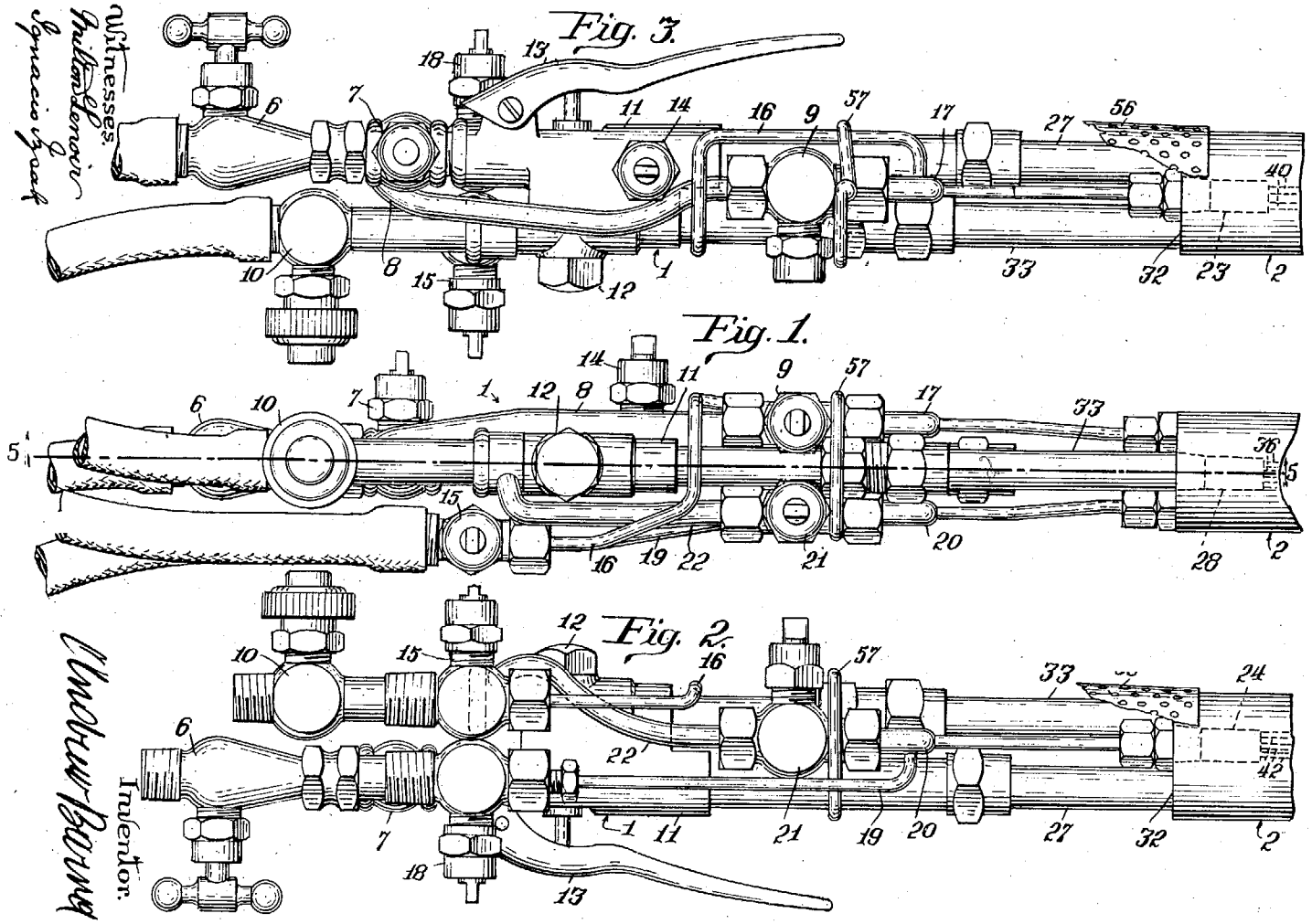

March 6, 1945. A. BARNA Re. 22,610
UNDERWATER TORCH
Original Filed Oct. 30, 1939 3 Sheets-Sheet 2
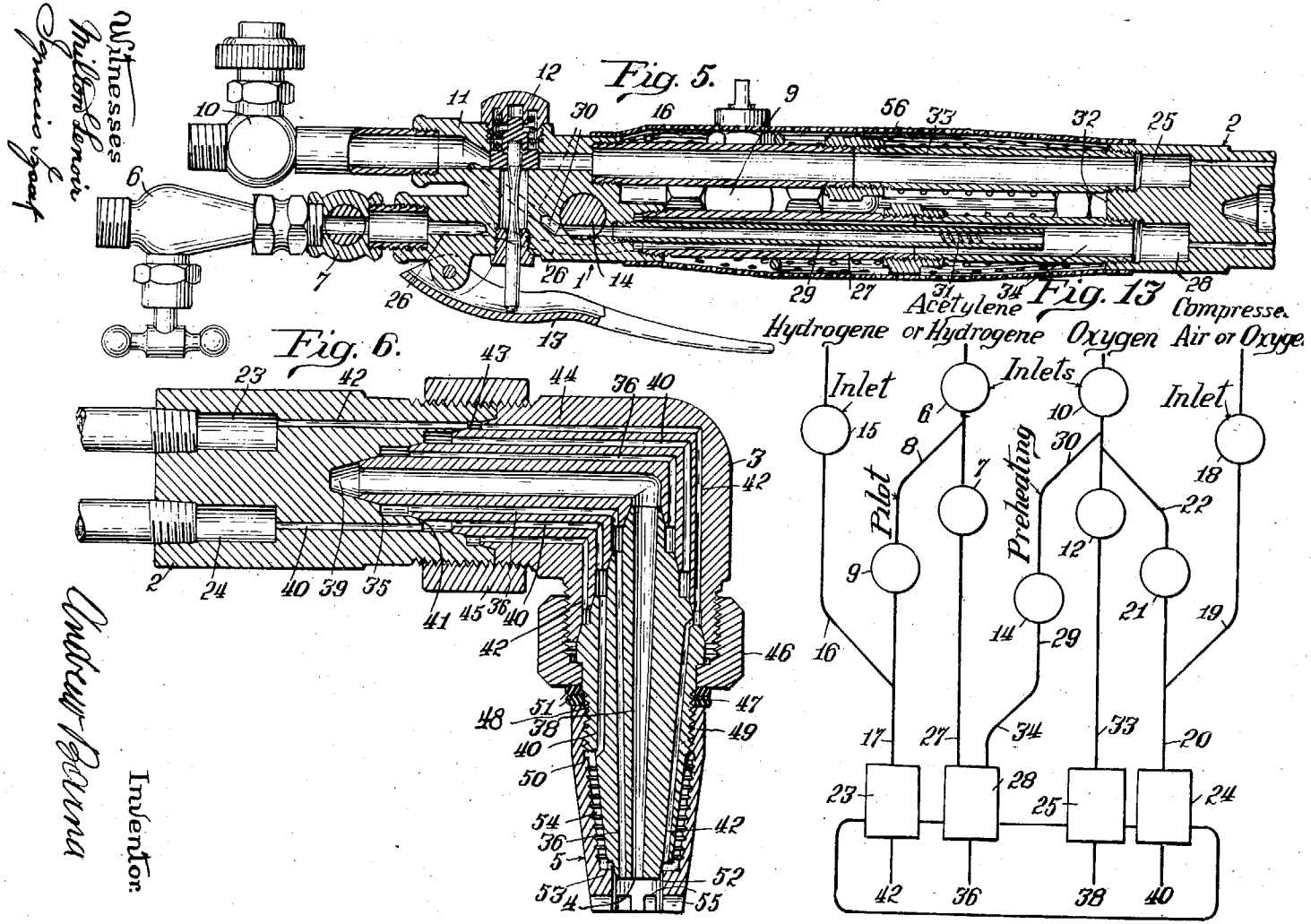
Witnesses
Milton Lenoir
Ignacio Izaaf
Inventor.
Andrew Barna March 6, 1945. A. BARNA Re. 22,610
UNDERWATER TORCH
Original Filed Oct. 30, 1939 3 Sheets-Sheet 3
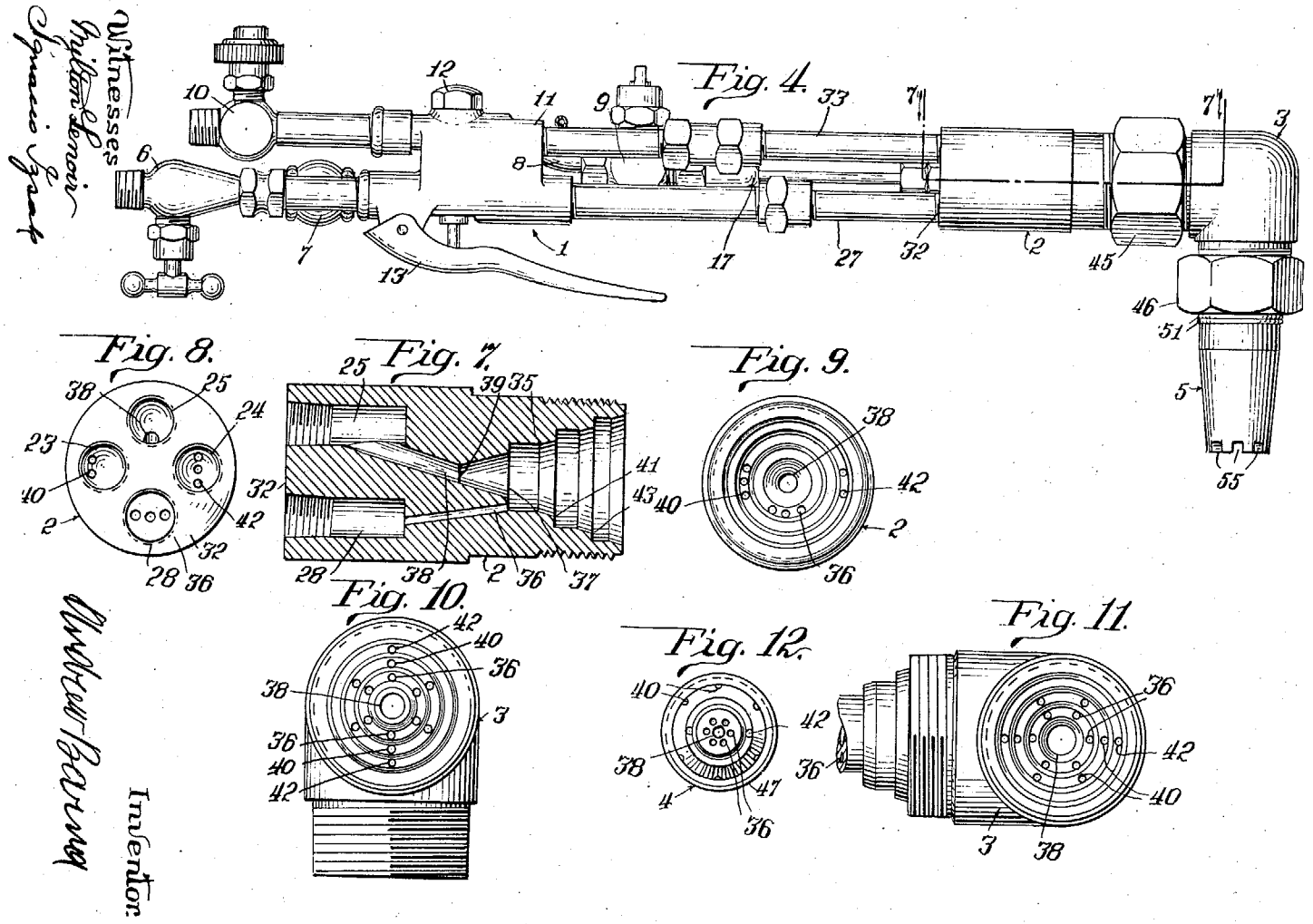
Witnesses
Milton Lenoir
Ignacio Szsak
Inventor
Andrew Barna Reissued Mar. 6, 1945

Re. 22,610

UNITED STATES PATENT OFFICE 22,610

UNDERWATER TORCH

Andrew Barna, Chicago, Ill.

Original No. 2,275,491, dated March 10, 1942, Serial No. 301,893, October 30, 1939. Application for reissue July 13, 1942, Serial No. 450,690

6 Claims. (Cl. 158—27.4)

This invention relates to a novel and improved underwater torch, which permits the torch to relight automatically under water.

The main object of the invention is to remove the chance of having the torch extinguished under the water and force the diver to come to the surface for reigniting same.

Another object of the invention is to permit the use of more than one type of gas at the same time.

A further object of the invention is to permit the device to be used either as a straight torch or to be changed by the attachment of a gooseneck to a torch with any desired angle.

A still further object of the invention is to permit a reduction in the numbers of lines leading from the surface, to provide more free movement to the diver.

A further object of the invention is to permit the use of a branchless torch nozzle-shield.

A still further object of the invention is to prevent the mixing chamber from overheating in case of back flash.

A still further object of the invention is to use the device on the surface or below the surface.

With the foregoing and other objects in view, which will appear as the description proceeds, the invention consists in certain novel features of construction and arrangements of parts hereinafter more fully described, illustrated in the accompanying drawings, and particularly pointed out in the appended claims, it being understood that various changes in the form, proportion, quantity, size and minor details of the structure may be made without departing from the spirit or sacrificing any of the advantages of the invention.

I have illustrated in the accompanying drawings a preferred embodiment of the invention, from an inspection of which, when considered in connection with the following description, the invention, its mode of construction and assembly, and many of its advantages, shall be readily understood and appreciated.

Referring to the drawings in which similar characters of reference are employed to indicate corresponding parts throughout the several figures of the drawings:

Figure 1 is an assembled plan view, with the torch tip end broken away;

Fig. 2 is a side elevation of the right side of Fig. 1;

Fig. 3 is an inverted side elevation of the left side of Fig. 1.

Fig. 4 is a side elevation like Fig. 2 with the valves and the by-passes on the right side being omitted;

Fig. 5 is a sectional view on line 5—5 of Fig. 1;

Fig. 6 is a continuation of Fig. 5 showing the straight head, the gooseneck and the torch tip end with the torch tip shield in section;

Fig. 7 is a sectional view of the straight head on line 7—7 of Fig. 4;

Fig. 8 is the near end elevation of the straight head;

Fig. 9 is the far end elevation of the straight head;

Fig. 10 is the near end elevation of the gooseneck;

Fig. 11 is an inverted plan view of the gooseneck;

Fig. 12 is an inverted plan view of the tip; and

Fig. 13 is a diagram of the passages, by-passes, valves and receptacles.

The said underwater torch is comprised essentially of a main body 1, a straight head 2, a gooseneck 3, a torch tip 4, and a torch tip shield 5.

The inlet valve 6 at its outer end is attached to the acetylene or hydrogen line, and at its inner end joins the valve 7, which controls the said gases. The valve 7 connects with the passage 26, and the tube 27 (Fig. 5) which is secured in the body portion 11, and enters the receptacle 28 of the straight head 2.

Between valves 6 and 7 is the by-pass 8, leading to valve 9, which regulates the flow of gases to the pilot light and leads to the receptacle 23 of the straight head 2.

The inlet valve 10 at its outer end is attached to the oxygen line and at its inner end connects to the body portion 11, housing the high pressure valve 12, which controls the flow of the oxygen during the cutting process. The high pressure lever 13 operates the said high pressure valve 12.

The inner end of the valve 10 is communicating through the high pressure valve 12 (see Fig. 5) with the tube 33 and the receptacle 25 of the straight head 2.

The valve 14 controls the oxygen to the preheating flame.

The inlet valve 15 at its outer end connects to the hydrogen line when the inlet valve 6 is used for acetylene. At its inner end it connects to the by-pass 16 which enters the outlet 17.

The outlet 17 is connected to the inner end of the valve 9 and leads to the receptacle 23 of the straight head 2.

The inlet valve 18 is connected at its outer end either with the oxygen or compressed air line.

At its inner end it is connected to by-pass 19 which enters the outlet 20.

The outlet 20 is secured to the inner end of the valve 21 and leads to the receptacle 24.

The by-pass 22 enters the body portion 11 between the valves 10 and 12 and is leading to the outer end of the valve 21 which at its inner end is connected to the receptacle 24 of the straight head 2.

The tube 29 is within the tube 27 and is secured in the body portion 11. The by-pass 30 leads from the inner end of the valve 10 to the control valve 14 and leads to the tube 29 with the mixer 31 suitably placed at its interior adjacent to its outlet, insuring a whirling motion to the gaseous mixture in the mixing chamber 34 which communicates with the receptacle 28 of the straight head 2.

The straight head 2 consists of a cylindrical body. At its near end 32 it is provided with the receptacles 23, 24, 25 and 28 to secure the outlets 17, 20 and the tubes 33, 27, respectively.

The suitable interior portion 35 of the straight head 2 is provided with a series of passages.

The passages 36 leading from the bottom of the receptacle 28 to the level 37 are conducting the mixed oxygen and gas. The passage 38 leading from the bottom of the receptacle 25 to the level 39 is conducting the oxygen for cutting purposes. The passages 40 leading from the bottom of the receptacle 24 to the level 41 are conducting the oxygen or compressed air. The passages 42 leading from the bottom of the receptacle 23 to the level 43 are conducting the acetylene or hydrogen for the pilot light. The use of hydrogen, or other suitable gases, prevents corrosion and accumulation of carbon at the opening of the pilot light which would set in when acetylene is used.

The suitable interior portion 44 of the rotatable gooseneck 3 is provided with the continuation of the passages 36, 38, 40 and 42.

The adapter 45 is provided with R. H. and L. H. threads, permitting the gooseneck 3 to rotate freely around the straight head 2 by means of the main body 1 being adapted to take any desired position for the convenience of the diver in using the high pressure lever 13.

The adapter 46 secures the torch tip 4 to the gooseneck 3.

The suitable torch tip 4 is provided with four levels, corresponding to the levels of 39, 37, 41 and 43 of the straight head 2, and with the continuation of the passages 36, 38, 40 and 42.

The torch tip 4 is provided with an externally threaded cylindrical portion 47 which retains the adjustable shield 5 at its set position.

The suitable interior 48 of the shield 5 is provided with a cylindrical portion 49 and an offset 50 at its lower end by means of which it can rest adjustably on the externally threaded portion 47 of the torch tip 4.

Th washers 51 are securely held down by the cylindrical portion 49 of the shield 5.

The suitable interior cylindrical portion 52 of the shield 5 has an offset 53. The conical portion 54, between the offsets 50 and 53, is provided with fine threads 58 to induce a whirling motion to the oxygen or compressed air before passing through the said cylindrical portion 52 and reaching the work. The knurled indentations 55 permit the gases generated during the cutting process to escape.

The perforated handle 56 prevents the mixing chamber 34 from overheating in case of back flash.

The loop 57 holds securely together the various outlets and tubes.

The Operation of the Torch

*Two line method—Without pilot light*

Assuming the use of the torch in shallow water by the "two line" method, using acetylene and oxygen, the tanks containing these gases are connected to the regulators and the hose from the regulator for the acetylene supply is connected to the valve 6 while the hose leading from the regulator for the oxygen supply is connected to the valve 10, the regulators being adjusted to suit the work being done. The acetylene valve 6 is first opened and this gas then passes through the adjusting valve 7, the tube 27, the receptacle 28 and then through the passages 36 to the mouth of the torch tip. The valves 10 and 14 are then opened and the oxygen is conducted through the by-pass 30 into the tube 29 and then into the mixing chamber 34 and the receptacle 28 and then through the passages 36 to the top of the torch tip. The valves 7 and 14 are adjusted to give the proper mixture for the pre-heating flame.

If the torch is to be used by the two line method with hydrogen instead of acetylene, as when operating in deep water, the operation is the same except the hydrogen supply, instead of the acetylene supply, is connected to the valve 6.

When using the two line method, the by-passes which have been provided serve the purpose of displacing the water and holding it away from the mouth of the torch tip. The by-pass 22, which serves that purpose, starts between the valves 10 and 12 and conducts the gas through the valve 21 to the outlet 20 which leads into the receptacle 24. From this receptacle the gas passes through the passage 40 and impinges against the offset 50 of the upper inner cylindrical portion of the shield 5. The oxygen then passes downwardly in contact with the threaded portion 54 of the shield by which it is given a whirling motion before it reaches the lower cylindrical portion 52 of the shield. By adjusting the valve 21 the supply of oxygen may be regulated to displace the water from the torch tip.

*Two line method—With pilot light*

If the two line method is to be used with the pilot light in operation, the procedure is the same as that which has just been described for the use of hydrogen and oxygen, except that the valve 9 is also opened, thereby causing hydrogen to pass through the outlet 17 to the receptacle 23 and thence through the passages 42 to the space between the torch tip and the shield to the offset 53 of the shield 5, thus causing the pilot light to function.

*Three line method—With pilot light*

If the "three line" method is to be used with a pilot light, the operation is the same as that for the two line method with a pilot light and using hydrogen, except that the valve 9 is closed and a regulator connected with a hydrogen tank is connected with the valve 15 which conducts the gas into the by-pass 16, the outlet 17, the receptacle 23, and the passage 42 to the offset 53 of the shield 5, thus causing the pilot light to function.

*Four line method—With pilot light*

In practicing the "four line" method of operation of the torch with a pilot light, the procedure is the same as when using the three line with pilot light, except that the valves 9 and 21 are closed and an oxygen supply is connected through a regulator to the inlet valve 18 which conducts the oxygen through the by-pass 19 into the outlet 20 by which it is conveyed to the receptacle 24. From this receptacle, the gas passes through the passage 40 to the offset 50 of the upper interior part of the shield 5, from which it passes in contact with the threaded portion 54 to the offset 53 and then outwardly through the cylindrical portion 52. If compressed air is to be used to displace the water, instead of oxygen, the compressed air supply is connected to the valve 18 in place of the oxygen connection.

It will be understood that the invention may take various forms other than that herein specifically described without departing from the scope of the appended claims in which the term "gas" is used generically as referring to compressed air, oxygen, acetylene or hydrogen. The term "integral" as used in the claims has its usual meaning as defining a one-piece unitary structure. Where reference is made in the claims to a passage through the tip for conveying oxygen or the like to the annular passage between the tip and the shield, it will be understood that the term "oxygen" is intended to include oxygen, compressed air, or other combustion supporting gaseous fluid which may be introduced through this passage.

I claim:

1. An underwater torch, comprising a water cooled main body formed as a handle, a straight head on the outlet end thereof, a rotatably adjustable gooseneck attached to said head, a torch tip on said gooseneck, a torch tip shield mounted on said tip, four inlet valves on the inlet end of said body, which are adapted for connection to hoses to supply hydrogen, acetylene, oxygen and compressed air, respecively, to said torch; conduits in said body to provide gas passages from said valves to said head, said head being chambered to provide gas receptacles therein; the hydrogen and compressed air valves being adapted to communicate with corresponding receptacles in said head by means of corresponding ones of said conduits; said acetylene inlet valve being adapted to communicate by means of one of said conduits with a corresponding one of said receptacles, a control valve in said acetylene conduit, said acetylene inlet valve also being provided with a by-pass conduit in communication with said hydrogen receptacle, a control valve in said last-named conduit, thereby providing an alternative pilot flame gas supply means; a conduit providing communication between said oxygen inlet valve and a corresponding one of said receptacles, a control valve in said conduit, two by-pass conduits providing passage for oxygen from said inlet valve respectively to said acetylene receptacle to provide a preheating gas mixture and to said compressed air receptacle; a control valve in each of said last-named by-pass conduits, said head, said gooseneck and said tip having passages therethrough adapted to communicate respectively with said four gas receptacles, said passages being so disposed in said tip as to provide a central oxygen discharge passage, a series of preheating gas discharge passages surrounding said oxygen passage, pilot gas discharge passages arranged around said preheating gas passages, and compressed air passages directing air from said air receptacle to the interior of said shield to displace water from around the jets from said tip.

2. An underwater torch, comprising a water cooled main body formed as a handle, a straight head on the outlet end thereof, a rotatably adjustable gooseneck attached to said head, a torch tip on said gooseneck, a torch tip shield mounted on said tip, four inlet valves on the inlet end of said body, which are adapted for connection to hoses to supply hydrogen, acetylene, oxygen and compressed air, respectively, to said torch; conduits in said body to provide gas passages from said valves to said head, said head being chambered to provide gas receptacles therein; the hydrogen and compressed air valves being adapted to communicate with corresponding receptacles in said head by means of corresponding ones of said conduits; said acetylene inlet valve being adapted to communicate by means of one of said conduits with a corresponding one of said receptacles, a control valve in said acetylene conduit, said acetylene inlet valve also being provided with a by-pass conduit in communication with said hydrogen receptacle, a control valve in said last-named conduit, thereby providing an alternative pilot flame gas supply means; a conduit providing communication between said oxygen inlet valve and a corresponding one of said receptacles, a control valve in said conduit, two by-pass conduits providing passage for oxygen from said inlet valve respectively to said acetylene receptacle to provide a preheating gas mixture and to said compressed air receptacle; a control valve in each of said last-named by-pass conduits; said head, said gooseneck and said tip having passages therethrough adapted to communicate respectively with said four gas receptacles; said passages leading through said head to the joint of said head with the torch tip are so disposed that each passage leads into a separate ring-like receptacle; all of said four receptacles being concentrically disposed along the conical contacting surfaces of said head and said tip and being formed by recesses in said surfaces; said passages in the torch tip being so disposed as to provide a central oxygen discharge passage, a series of preheating gas discharge passages surrounding said oxygen passage, pilot gas discharge passages arranged around said preheating gas passages, and compressed air passages directing air from said air receptacle to the interior of said shield to displace water from around the jets from the said tip.

3. An underwater torch, comprising a water cooled main body formed as a handle, a straight head on the outlet end thereof, a rotatably adjustable gooseneck attached to said head, a torch tip on said gooseneck, a torch tip shield mounted on said tip, four inlet valves on the inlet end of said body, which are adapted for connection to hoses to supply hydrogen, acetylene, oxygen and compressed air, respectively, to said torch; conduits in said body to provide gas passages from said valves to said head, said head being chambered to provide gas receptacles therein; the hydrogen and compressed air valves being adapted to communicate with corresponding receptacles in said head by means of corresponding ones of said conduits; said acetylene inlet valve being adapted to communicate by means of one of said conduits with a corresponding one of said receptacles, a control valve in said acetylene conduit, said acetylene inlet valve also being provided with a by-pass conduit in communication with said hydrogen receptacle, a control valve in said last-named conduit, thereby providing an alternative pilot flame gas supply means; a conduit providing communication between said oxygen inlet valve and a corresponding one of said receptacles, a control valve in said conduit, two by-pass conduits providing passage for oxygen from said inlet valve respectively to said acetylene receptacle to provide a preheating gas mixture and to said compressed air receptacle; a control valve in each of said last-named by-pass conduits; said head, said gooseneck and said tip having passages therethrough adapted to communicate respectively with said four gas receptacles, said passages being so disposed in said tip as to provide a central oxygen discharge passage, a series of preheating gas discharge passages surrounding said oxygen passage, pilot gas discharge passages arranged around said preheating gas passages, and compressed air passages directing air from said air receptacle to the interior of said shield, the interior surface of which has fine threads extending along its conical portion to conduct the gas around the torch tip for displacing water from around the jets from said tip.

4. An underwater torch comprising a body having passages therethrough, means for supplying gases to said passages, a head connected to the outlet end of said body and having passages therethrough communicating with the passages in said body, a one-piece torch tip detachably secured to said head and having a plurality of passages extending therethrough and communicating with the passages in said head, said passages through said tip including passages for conveying gases to the mouth of said tip and for conveying gases to a point in proximity to the mouth of said tip for maintaining a pilot light and also a passage opening laterally through the side of said tip at a point removed from its mouth, and a shield forming a restricted passage around said tip into which oxygen is discharged through said passage opening laterally through said tip, said shield forming a restricted passage at the mouth of said tip in proximity to the mouth of said pilot light passage into which the gases for said pilot light are discharged.

5. An underwater torch comprising a head having a plurality of chambers, means for conveying a separate gas to each of said chambers, means for mixing gases which are conveyed to certain of said chambers, a torch tip having internal passages therethrough for receiving gases from said chambers, an intermediate member between said head and said tip having passages therethrough communicating with said passages in said tip, said head having passages therein leading from said chambers to said passages in said intermediate member, and a shield surrounding a portion of said tip and forming an annular passage opening at the mouth of said tip, at least one of said passages in said tip opening into said annular passage substantially at the mouth of said tip and being adapted to convey gas for maintaining a pilot light, another of said passages in said tip opening into said annular passage rearwardly of the mouth of said pilot light passage and being adapted to convey a gas for propelling water away from the mouth of said tip and supporting combustion of said pilot light gas.

6. An underwater torch comprising a head, a torch tip connected to said head, said head and said torch tip having passages therethrough for conveying different gases therethrough to the mouth of said tip, inlet valves through which a plurality of gases are separately supplied to said torch, said head being chambered to provide gas receptacles each communicating with one of said passages in said head, conduits for conveying gases from said inlet valves to said gas receptacles, a control valve in one of said conduits, and a by-pass conduit by-passing said control valve and leading to the receptacle to which another of said first-mentioned conduits is connected, thereby permitting different gases to be supplied to one of said gas receptacles.

ANDREW BARNA.